United States Patent
Hachisuka et al.

(10) Patent No.: US 8,467,742 B2
(45) Date of Patent: Jun. 18, 2013

(54) COMMUNICATIONS APPARATUS

(75) Inventors: Keisuke Hachisuka, Nagoya (JP); Takayuki Shibata, Nisshin (JP); Ryoichi Sugawara, Nagoya (JP)

(73) Assignee: DENSO CORPORATION, Kariya (JP)

( * ) Notice: Subject to any disclaimer, the term of this patent is extended or adjusted under 35 U.S.C. 154(b) by 587 days.

(21) Appl. No.: 12/659,637

(22) Filed: Mar. 16, 2010

(65) Prior Publication Data

US 2010/0237988 A1  Sep. 23, 2010

(30) Foreign Application Priority Data

Mar. 17, 2009  (JP) .................................. 2009-63867

(51) Int. Cl.
*H04B 1/034* (2006.01)

(52) U.S. Cl.
USPC .............................................. 455/100; 380/9

(58) Field of Classification Search
USPC ........................................................ 455/100
See application file for complete search history.

(56) References Cited

U.S. PATENT DOCUMENTS

| | | | | |
|---|---|---|---|---|
| 5,796,827 A | * | 8/1998 | Coppersmith et al. | ........ 713/182 |
| 2008/0287061 A1 | | 11/2008 | Kim et al. | |
| 2009/0233558 A1 | | 9/2009 | Hwang et al. | |

FOREIGN PATENT DOCUMENTS

| | | | |
|---|---|---|---|
| JP | 2007-006420 A | | 1/2007 |
| WO | WO 2007049845 A2 | * | 5/2007 |
| WO | WO 2007148877 A1 | * | 12/2007 |

OTHER PUBLICATIONS

Office Action mailed Jan. 25, 2011, issued in corresponding JP patent application No. 2009-63867 (English translation).
Koichi Ito et al., "Transmission Mechanism of Wearable Devices Using the Human Body as a Transmission Channel," Artech House, 2006, pp. 65-92.

* cited by examiner

*Primary Examiner* — Ajibola Akinyemi
(74) *Attorney, Agent, or Firm* — Posz Law Group, PLC

(57)  ABSTRACT

An electrode group is provided in a portable terminal carried by a human body for transmitting a transmission signal to the human body functioning as a transmission medium. The electrode group contains three electrodes arranged respectively at three vertices of an equilateral triangle. Three types of driving electrode pairs are defined as respectively having different combination of optional two electrodes. While changing the driving electrode pairs for use in order one pair by one pair, the transmission signal based on the same transmission data is repeatedly transmitted as many times as the number of driving electrode pairs.

27 Claims, 12 Drawing Sheets

COMMUNICATIONS APPARATUS

CROSS REFERENCE TO RELATED APPLICATION

The present application is based on and incorporates herein by reference Japanese Patent Application No. 2009-63867 filed on Mar. 17, 2009.

FIELD OF THE INVENTION

The present invention relates to a communications apparatus which carries out data communications by using a human body as a transmission medium. Furthermore, the present invention relates to a smart entry system for a vehicle using the above communications apparatus and a method for controlling data communications taking place in the above communications apparatus.

BACKGROUND OF THE INVENTION

[Patent document 1] JP-2007-6420 A
[Non-patent document 1] K. Ito and M. Takahashi, and K. Fujii: Transmission Mechanism of Wearable Devices Using the Human Body as a Transmission Channel, in "Antennas and Propagation for Body-Centric Wireless Communications (Peter S. Hall and YangHao (Eds.))," Artech House, pp. 65-92, 2006

There is conventionally known a communications apparatus, which is attached to a user and carries out data communications (i.e., intrabody communication) with an external device contacted by the user via a communications channel partially constituted by the user's body.

For instance, Patent document 1 describes such a type of a communications apparatus equipped with two electrodes which contact a body of a user wearing the apparatus while one of the two electrodes is used as a reference electrode and the other is used as a transmission electrode.

Patent document 1 also discloses a technology that a directionality at the time of the transmission is affected by the arrangement of the electrodes. That is, when the apparatus is worn by a user in an arm such that two electrodes are aligned in an axis or direction of the arm, the efficiency is improved by about 20 dB in comparison with the case that the two electrodes are aligned in a direction orthogonal to the arm axis.

The vector indicating a direction allowing the maximum transmission efficiency is referred to as a directional vector.

The communications apparatus in Patent document 1 is a type of a wrist watch fixedly attached to an arm or the like so that the positional relation between the electrodes and the human body is constant. Alternatively, another type such as a card type is studied. In such a type, the positional relationship between the electrodes and the human body is differentiated on each occasion or each time.

It is noted that the communications apparatus can be desirably attached to a human body such that the directional vector (i.e., electrodes arrangement direction) is along the channel from the communications apparatus to an external device. However, in any type of communications apparatuses, the positional relation between the communications apparatus and the external device may change depending on attachment positions of the apparatus (right hand/left hand/chest pocket/hip pocket, etc.), users' postures (standing position/seating position), users' portions contacting external devices of communications partners (right hand/left hand, etc.) In addition, the wrist watch type of the communications apparatus can have a directional vector whose direction at the attachment position of the communications apparatus is constant. In contrast, the card type of the communications apparatus has a directional vector whose direction is varied depending on the attachment state (direction or inclination degree, etc in the pocket).

That is, the communications quality may be deteriorated remarkably or the capability may be disabled, depending on the above various states.

SUMMARY OF THE INVENTION

The present invention is made in order to address the above issues. It is an object to provide a communications apparatus enabling stable signal transmissions without relation to a state of a body to which the apparatus is attached or a state of the attachment of the apparatus.

To achieve the above object, according to an example of the present invention, a communications apparatus is provided as follows. The apparatus communicates with an external apparatus via a wearing body that functions as a transmission medium. The apparatus is worn by the wearing body, which contacts the external apparatus. An electrode group is configured to include at least three electrodes that are held in contact with or in proximity of the wearing body when the apparatus is worn by the wearing body. An electrode selection section is configured to (i) designate a plurality of driving electrode pairs, each driving electrode pair being a combination of a first driving electrode and a second driving electrode, the first driving electrode including at least a single electrode included in the electrode group, the second driving electrode including at least a single electrode, which is included in the electrode group but not included in the first driving electrode, (ii) designate a driving electrode pair group, which includes at least two driving electrode pairs that have mutually different directional vectors, each directional vector being a vector linking a position of a gravity center of the first driving electrode with a position of a gravity center of the second driving electrode, and (iii) select a single driving electrode pair from among the driving electrode pairs included in the driving electrode pair group. A transmission section is configured to transmit a signal to the wearing body via the driving electrode pair selected by the electrode selection section when the apparatus is worn by the wearing body.

Under such a configuration of the communications apparatus, the direction of the directional vector (i.e., direction in which the signal intensity is provided at maximum) can be suitably switched by selecting a driving electrode pair. The stable signal transmission can be thus achieved without relation to the attachment state of the apparatus (inclination at the attachment position, etc.) or the state of the wearing body or object (the contact position with the external apparatus, and posture if the wearing body is a human body, etc.).

Further, the direction of the directional vector can be finely controllable by selecting suitably a combination (number or arrangement) of the electrodes constituting the first and the second driving electrodes.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, description will be given to embodiments of the present invention with reference to the drawings.

First Embodiment

Figure 1:
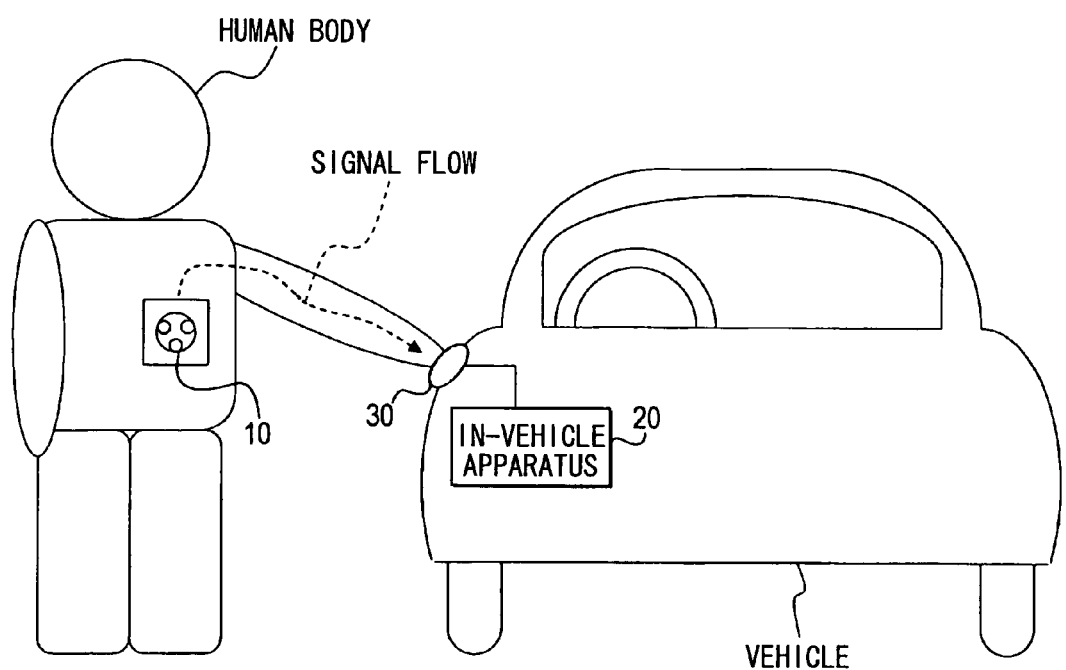
FIG. 1 is a diagram illustrating a schematic configuration of a smart entry system.

FIG. 1 is a diagram illustrating a schematic configuration of a smart entry system to which the present invention is directed. Further, the smart entry system includes a portable terminal, which can be referred to as a communications apparatus.

<Overall Configuration>

The smart entry system for a subject vehicle includes the following: a portable terminal 10 shaped of a card; a vehicle-side electrode 30 provided in a door handle of a driver's seat door of the vehicle; and an in-vehicle apparatus 20. Herein, the portable terminal 10 is carried or worn by a user; in other words, the portable terminal 10 is used by accompanying a user or being attached to the user. The in-vehicle apparatus 20 executes intrabody communication (also referred to human body data communications) with the portable terminal 10 via the vehicle-side electrode 30 when the user carrying or wearing the portable terminal 10 touches the vehicle-side electrode 30.

It is noted that the portable terminal 10 stores, at least, authentication data for identifying a holder of the portable terminal 10. The authentication data is transmitted using the intrabody communication. In contrast, the in-vehicle apparatus 20 receives the authentication data by the intrabody communication. Upon determining that the authentication data is valid, the in-vehicle apparatus 20 performs unlocking and locking of a vehicle door.

<Portable Terminal>

Figure 2A:
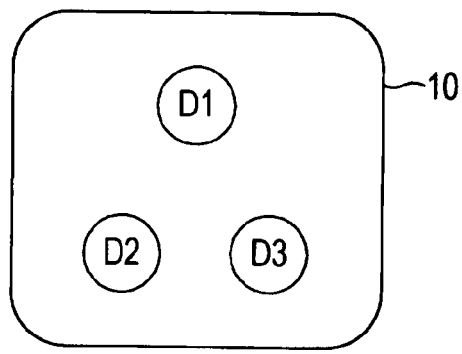
FIG. 2A is an external view of a portable terminal according to a first embodiment of the present invention.
Figure 2B:
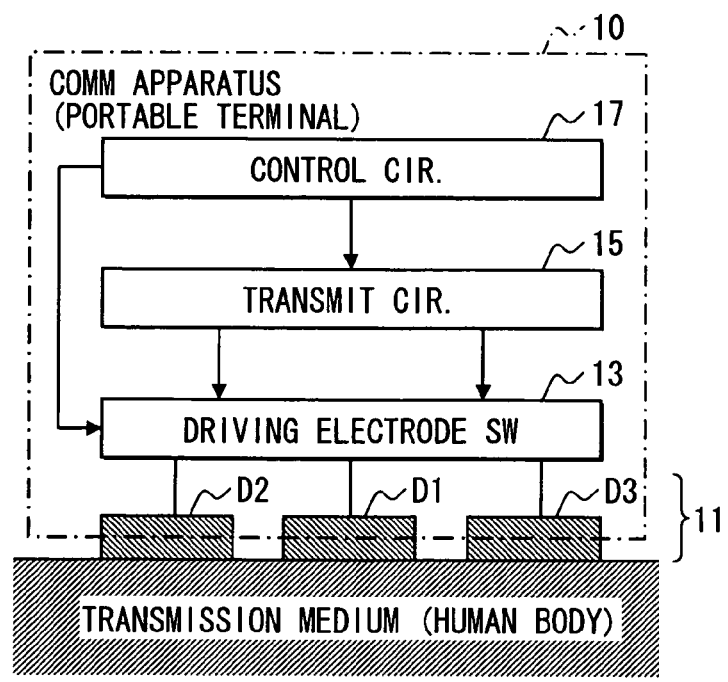
FIG. 2B is a diagram illustrating an internal configuration of the portable terminal.

FIG. 2A is an external view of a portable terminal 10; FIG. 2B is a diagram illustrating an internal configuration of the portable terminal 10. The portable terminal 10 is provided with an electrode group 11, which includes three disk-shaped electrodes D1, D2, and D3. Three electrodes D1, D2, and D3 are arranged respectively at vertices of an equilateral triangle, as illustrated in FIG. 2A and exposed from one side of the card, i.e., portable terminal 10. That is, the portable terminal 10 is configured to be held in a state to directly or indirectly contact a user when the portable terminal 10 is inserted in a chest pocket, a hip pocket, etc. of the clothing of the user. Furthermore, the electrodes D1 to D3 are arranged so as to be maximally separated from each other as far as possible within the planimetric size or dimension of the portable terminal 10.

In addition, as illustrated in FIG. 2B, the portable terminal 10 further includes a driving electrode changeover switch 13, a transmission circuit 15, and a control circuit 17. The driving electrode changeover switch 13 is to set up or designate, as a driving electrode pair, optional two electrodes out of the three electrodes D1 to D3 constituting (i.e., included in) the electrode group 11. The transmission circuit 15 is to generate a signal (transmission signal) and transmit the signal to the in-vehicle apparatus 20 via the driving electrode pair selected by the driving electrode changeover switch 13 to a transmission medium. The control circuit 17 is to control the state of the driving electrode changeover switch 13, and an operation of the transmission circuit 15.

That is, the portable terminal 10 is configured to execute intrabody communications by a so-called electric current method, which uses a driving electrode pair containing two electrodes, and transmits an electric current through a human body to thereby transmit a signal.

<Driving Electrode Changeover Switch>

The driving electrode changeover switch 13 is to change the designation (i.e., setting) according to a switching signal from the control circuit 17 such that the transmission signal from the transmission circuit 15 is supplied to any one driving electrode pair of the several predetermined driving electrode pairs (hereinafter, referred to as a driving electrode pair group).

Figure 3A:
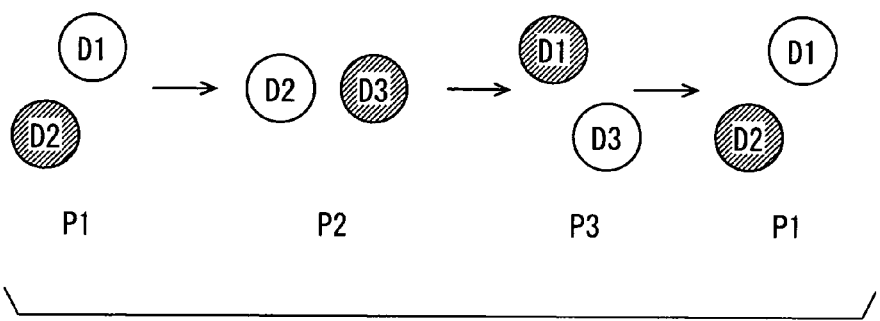
FIG. 3A is a diagram illustrating a designation and a change order of a driving electrode pair.
Figure 3B:
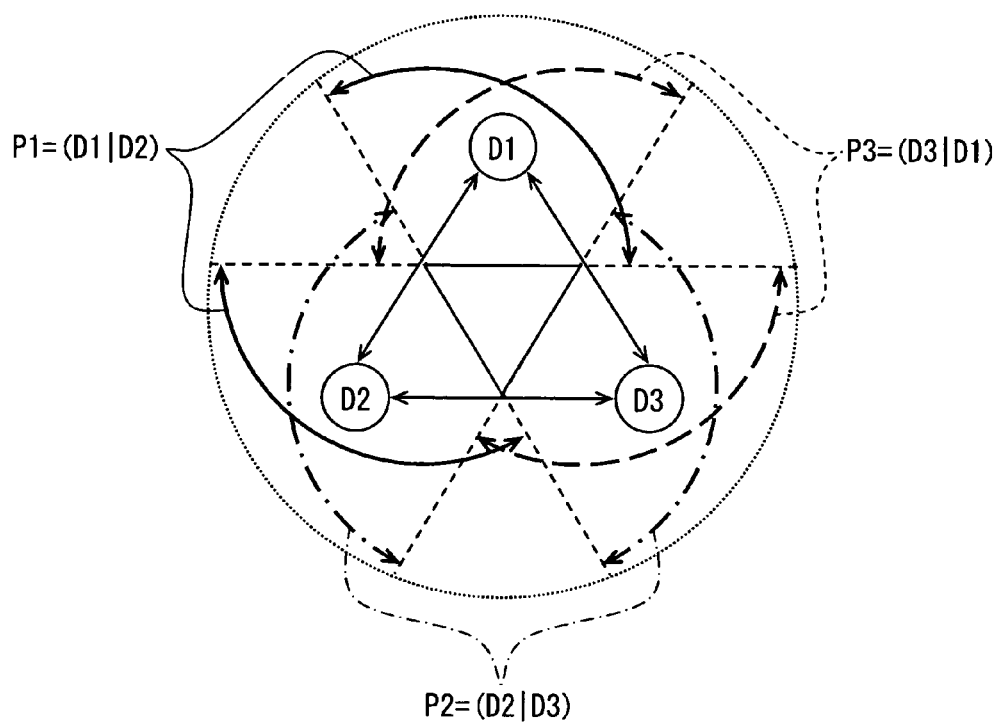
FIG. 3B is a diagram illustrating a directionality of each driving electrode pair.

FIG. 3A is a diagram for explaining a configuration of each driving electrode pair and a change order of the driving electrode pairs, i.e., the driving electrode pair group. FIG. 3B is a diagram illustrating a directionality of each driving electrode pair. The following are definitions for explanation. Of the two electrodes constituting a single driving electrode pair, an electrode used as a signal electrode is referred to as a first driving electrode while an electrode used as a reference electrode is referred to as a second driving electrode. In addition, a vector which advances from the gravity center of the second driving electrode to the gravity center of the first driving electrode is referred to as a directional vector.

A driving electrode pair Pi (i=1, 2, ..., n) is represented by Pi=(electrode constituting a first driving electrode|electrode constituting a second driving electrode). Thus, the following three types of driving electrode pairs are prepared: P1=(D1|D2); P2=(D2|D3); and P3=(D3|D1). It is noted that, in FIG. 3A, a white round mark is a first driving electrode, whereas a shaded round mark is a second driving electrode.

Further, each driving electrode pair has an area range in which a favorable transmission quality is obtained. Such an area range has a beam width of ±60 degrees with a central focus on a direction of a directional vector. Thus, the favorable signal transmission can be achieved at the following area ranges as illustrated in FIG. 3B: an angular area range indicated by the arrows of the bold solid line with respect to the driving electrode pair P1; an angular area range indicated by the arrows of the long and short dash line with respect to the driving electrode pair P2; and an angular area range indicated by the arrows of the dashed line with respect to the driving electrode pair P3. The portable terminal 10 is thus designed to have a favorable signal transmission area range so as to cover an omnidirectional area range (360 degree area range).

Furthermore, a selection sequence for the driving electrode pairs is predetermined, as illustrated in FIG. 3A. That is, the selection sequence is in an order of P1→P2→P3→P1→ . . . .

<Transmission Circuit>

The transmission circuit 15 performs a known operation as follows. Upon receiving transmission data supplied from the control circuit 17, a bit string is generated which indicates a transmission frame in which a header etc. is added to the transmission data. Using the bit string, a transmission signal is generated by carrying out the digital modulation of carrier waves. This technology is well-known.

<Control Circuit>

The control circuit 17 includes mainly a microcomputer which has a CPU, a ROM, a RAM, etc. The ROM stores (i) a program of a transmission process to transmit authentication data and (ii) the authentication data to be transmitted at least.

Figure 4:
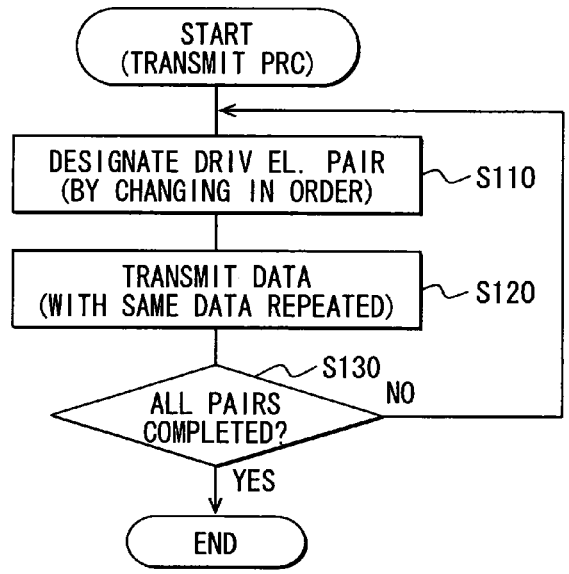
FIG. 4 is a flowchart of a transmission process by a control circuit of the portable terminal.

The transmission process executed by the CPU of the control circuit 17 is explained with reference to a flowchart indicated in FIG. 4.

<Transmission Process>

The present process is started each time a predetermined starting condition is satisfied. The process may be started every fixed cycle or started based on an instruction signal from a detection section, which is provided for detecting a state of the portable terminal 10, for instance, an attachment state and a distance from the vehicle. In addition, the starting condition may be satisfied when the data to be transmitted is, generated in another process separately executed.

It is further noted that a flowchart or the processing of the flowchart in the present application includes sections (also referred to as steps), which are represented, for instance, as S110. Further, each section can be divided into several subsections while several sections can be combined into a single section. Furthermore, each of thus configured sections can be referred to as a means or unit and achieved not only as a software device but also as a hardware device.

As the present process is started, at S110, a driving electrode pair, which is to be used, is designated by outputting a switching signal to the driving electrode changeover switch 13. It is noted that driving electrode pairs are switched according to the above-mentioned selection sequence each time the present S110 is executed.

At S120, transmission data (i.e., authentication data in the present embodiment) is supplied to the transmission circuit 15; thereby, the transmission circuit 15 is caused to generate and output a transmission signal. The outputted transmission signal is then transmitted from a driving electrode pair selected by the driving electrode changeover switch 13 to the in-vehicle apparatus 20 via the transmission medium (i.e., human body).

Furthermore, the processing at S110 is repeatedly executed the number of times as many as the number of driving electrode pairs to be explained later. At each execution of S110, the same transmission data is supplied to the transmission circuit 15. At S130, it is determined whether all the driving electrode pairs are thoroughly selected, i.e., whether the selection at S110 rounds the selection sequence completely.

If the selection sequence is not thoroughly rounded, the processing returns to S110, where a new driving electrode pair is selected and data communications is repeated via the selected driving electrode pair. In contrast, when the selection sequence is thoroughly rounded, the present process is terminated.

<Operation>

Figure 5:
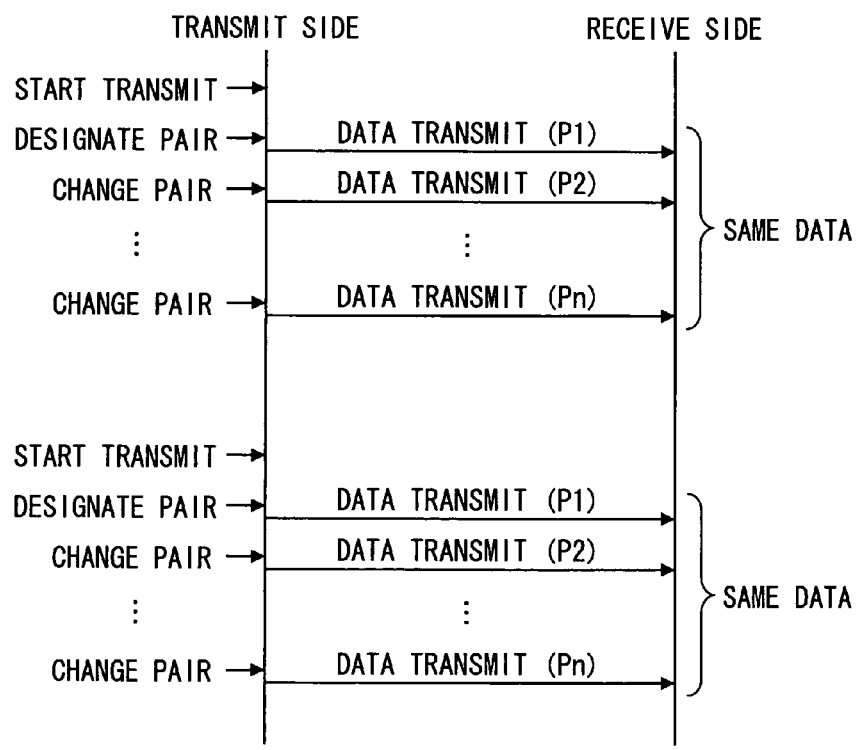
FIG. 5 is a sequence diagram illustrating a systematic operation.

Under the above-explained configuration of the smart entry system, the following sequence takes place as illustrated in FIG. 5. Each time the transmission process is started in the portable terminal 10, the transmission signal based on the same transmission data is repeatedly transmitted n times as many as the number of driving electrode pairs (n=3, at present case) while repeatedly changing the driving electrode pairs.

Upon receiving the transmission data, the in-vehicle apparatus 20 authenticates the authentication data obtained via the demodulation of the received transmission data. When the authentication data is affirmatively or successfully authenticated, the in-vehicle apparatus 20 confirms that the user holding or wearing the portable terminal 10 of a transmission source is an authenticated user, thereby performing door unlocking or door locking.

<Effect>

As explained above, the portable terminal 10 is provided as follows. An electrode group 11 is provided to transmit a transmission signal to a transmission medium (human body) by containing three electrodes D1 to D3 arranged respectively at three vertices of an equilateral triangle. Three types of driving electrode pairs P1 to P3 are designated as respectively having different combination of optional two electrodes. While changing the driving electrode pairs P1 to P3 for use one pair by one pair in order, the transmission signal based on the same transmission data is thus repeatedly transmitted as many as the number of driving electrode pairs.

According to the portable terminal 10 of the present embodiment, a stable signal transmission can be executed without relation to the attachment state of the portable terminal 10 (e.g., the inclination at the attachment position) or the state of the user wearing the portable terminal 10 (e.g., the posture of the user or the portion of the user contacting the in-vehicle apparatus 20).

That is, the portable terminal 10 is provided with a beam area range, where any direction within all the directions of 360 degrees is surely covered by at least one of the driving electrode pairs. The beam area range signifies an angular area range within which the favorable transmission is achievable. The state of the favorable transmission can be thus constantly maintained even if the transmission channel of the transmission signal changes in the transmission medium (human body) depending on the user's condition or state.

Modification Example

In the present embodiment, the driving electrode pair group includes the three types of driving electrode pairs P1 to P3. Without need to be limited thereto, other three types of driving electrode pairs may be provided by switching between the first driving electrode and the second driving electrode. That is, P4=(D2|D1), P5=(D3|D2), and P6=(D1|D3) are added, thereby forming the driving electrode pair group by six types of driving electrode pairs P1 to P6. In such a case, the directional vector can be changed every 60 degrees, only requiring the beam width of each electrode pair P1 to P6 to cover ±30 degrees.

Figure 6:
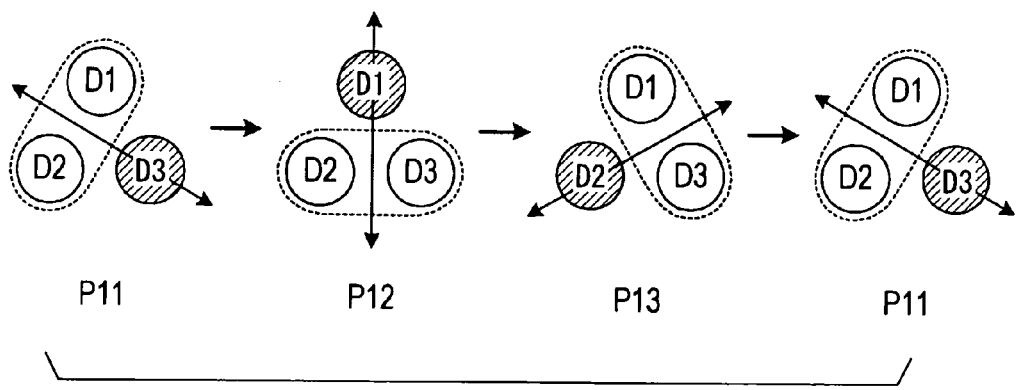
FIG. 6 is a diagram illustrating another example of a configuration of a driving electrode pair.

In addition, in the present embodiment, each of the first driving electrode and the second driving electrode is configured as a single electrode. Without need to be limited thereto, as illustrated in FIG. 6, for instance, the first driving electrode can be configured or defined as a combination of two electrodes. That is, the driving electrode pair group may be provided to have the following driving electrode pairs: P11=(D1, D2|D3), P12=(D2, D3|D1), and P13=(D3, D1|D2).

In such a case, other three types of driving electrode pairs may be provided by switching between the first driving electrode and the second driving electrode. That is, P14=(D3|D1, D2), P15=(D1|D2, D3), and P16=(D2|D3, D1) are added, thereby forming the driving electrode pair group by six types of driving electrode pairs P11 to P16.

Furthermore, the driving electrode pair group may contain in mixture the driving electrode pairs P1 to P6 and the driving electrode pairs P11 to P16. In such a case, the directional vector can be changed every 30 degrees.

In addition, when the driving electrode pair group is configured by the driving electrode pairs P11 to P13, another configuration may be considered. That is, the driving electrode changeover switch 13 may be configured to control at least one of the amplitudes or phases of the two electrodes, which constitute the first driving electrode, respectively. A directionality adjustment section may be additionally configured to be included in the control circuit 17, for changing the amplitude or the phase in between both the electrodes. The direction of the directional vector can be thus changeable.

Second Embodiment

The following describes a second embodiment of the present invention.

The portable terminal 10a of the present second embodiment is only different from the portable terminal 10 of the first embodiment in that a part of the configuration and the transmission process executed by the control circuit 17. The following thus mainly explains such a different point. Furthermore, a reception process is explained which is necessary for the in-vehicle apparatus 20 in conjunction with the change in the transmission process.

<Configuration>

Figure 7:
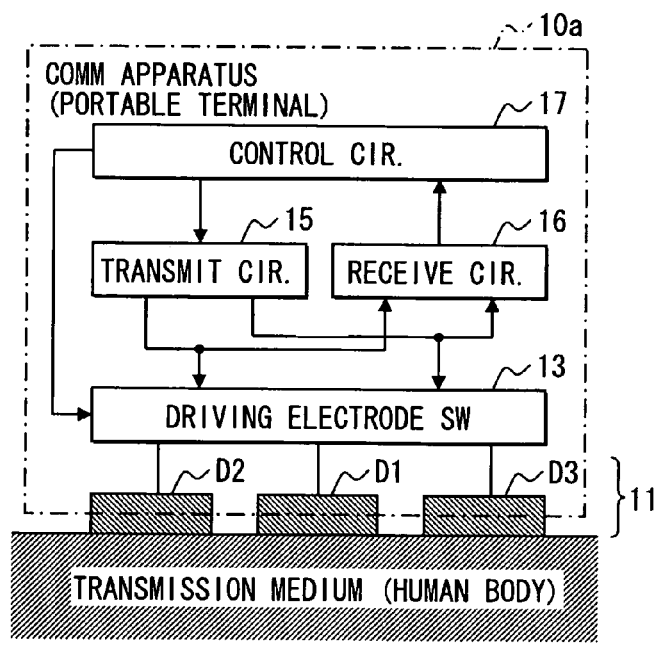
FIG. 7 is a block diagram illustrating an internal configuration of a portable terminal according to a second embodiment of the present invention.

FIG. 7 is a block diagram illustrating an internal configuration of the portable terminal 10a (i.e., communications apparatus).

As illustrated in FIG. 7, the portable terminal 10a is configured similar to the portable terminal 10 of the first embodiment, except that a reception circuit 16 is added so as to receive a reception signal from the in-vehicle apparatus 20 (i.e., acquired from the transmission medium) via the driving electrode pair selected by the driving electrode changeover switch 13.

Furthermore, the in-vehicle apparatus 20 includes, at least, the following: a transceiver section to transmit and receive a signal by the intrabody communication via the vehicle-side electrode 30; a measurement device to measure a signal strength of the received signal; and a signal processing device to execute a reception process based on the signal received via the transceiver section.

<Transmission Process>

Figure 8:
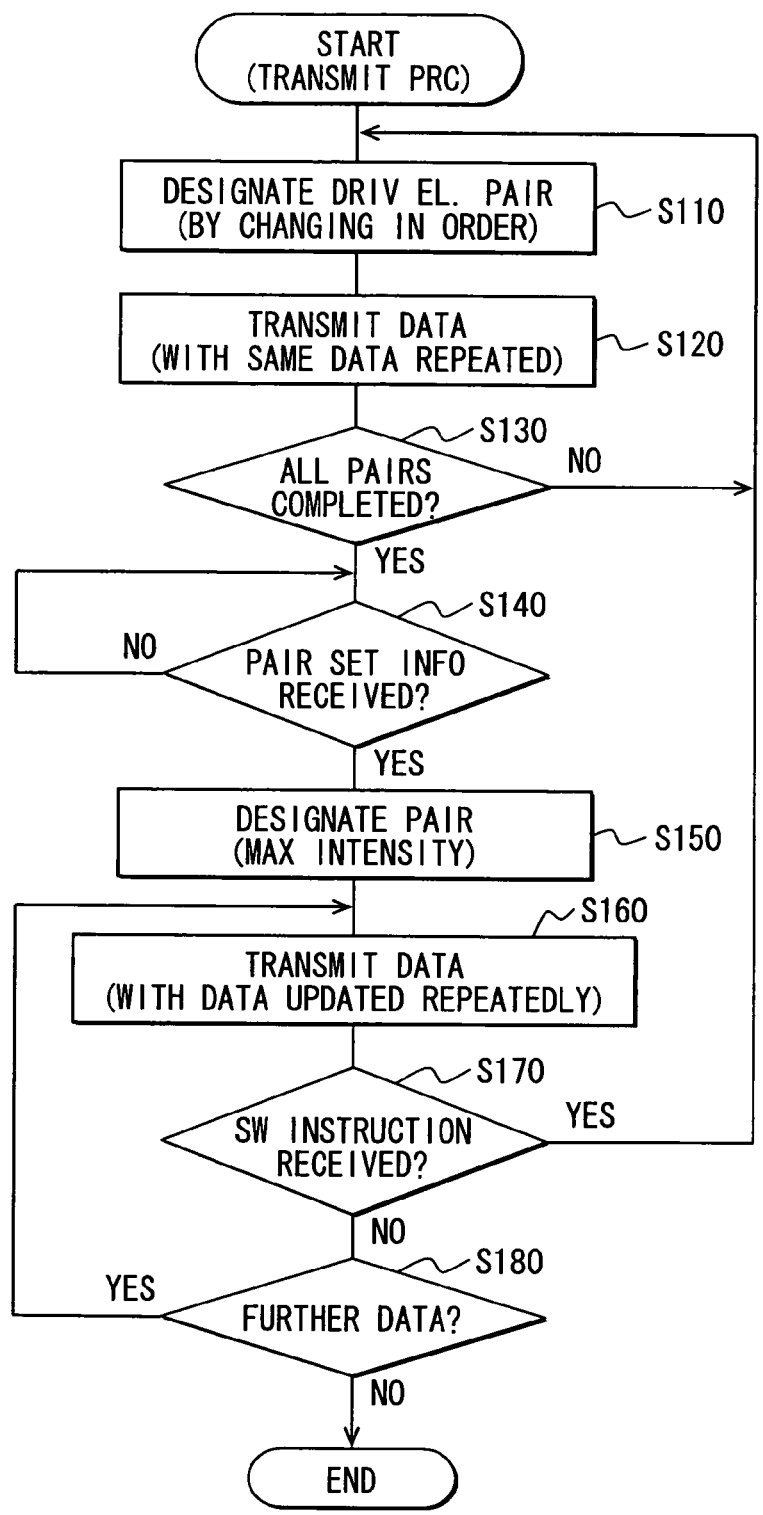
FIG. 8 is a flowchart of a transmission process by a control circuit of the portable terminal according to the second embodiment.

The following explains a transmission process executed by the control circuit 17 of the portable terminal 10a with reference to FIG. 8. Furthermore, the starting condition of the present process and the processing of S110 to S130 are identical to those of the first embodiment.

When the selection sequence of the driving electrode pairs is completely rounded at S110 to S130, at S140, the processing stands by until the reception circuit 16 receives pair setup information from the in-vehicle apparatus 20. It is noted that the pair setup information signifies information for identifying a driving electrode pair (referred to as a maximum-intensity supplying driving electrode pair) which is selected at the time when the reception intensity is provided to be maximum in the in-vehicle apparatus 20 with respect to the transmission signals transmitted by the processing of S110 to S130. Alternatively, such information may be information which indicates what number from the first the transmission signal is. Further, if the transmission signal contains information for identifying a driving electrode pair, such information can be used for that purpose.

When the pair setup information is received, at S150, the switching signal is outputted to the driving electrode changeover switch 13 so that the driving electrode pair specified from the pair setup information may be selected. At S160, the transmission data is supplied to the transmission circuit 15; thus, the transmission circuit 15 generates and outputs a transmission signal. The outputted transmission signal is transmitted from the maximum-intensity supplying driving electrode pair selected by the driving electrode changeover switch 13 to the in-vehicle apparatus 20 via the transmission medium (human body). Again, it is noted that the maximum-intensity supplying driving electrode pair signifies a driving electrode pair which provides the maximum reception intensity in the in-vehicle apparatus 20 among all the driving electrode pairs.

Furthermore, at S160, unlike at S120, each time S160 is repeated, different transmission data (i.e., having a different transmission element) is supplied to the transmission circuit 15. At S170, the reception circuit 16 determines whether pair switching information (explained later) is received from the in-vehicle apparatus 20. When received, the processing returns to S110, where the processing. S110 to S150 is repeated to detect the maximum-intensity supplying driving electrode pair.

In contrast, when the pair switching information is not received, the processing proceeds to S180, where it is determined whether there is any transmission data which should be transmitted to the in-vehicle apparatus 20. When there is such data, the processing returns to S160, where the transmission is continued. When there is no such data, the present process is terminated.

With respect to the processing of S120 and S160, identification information is added which identifies either the data transmitted at S120 (referred to as search data) or the data transmitted at S160 (referred to as usual data).

<Reception Process>

Figure 9:
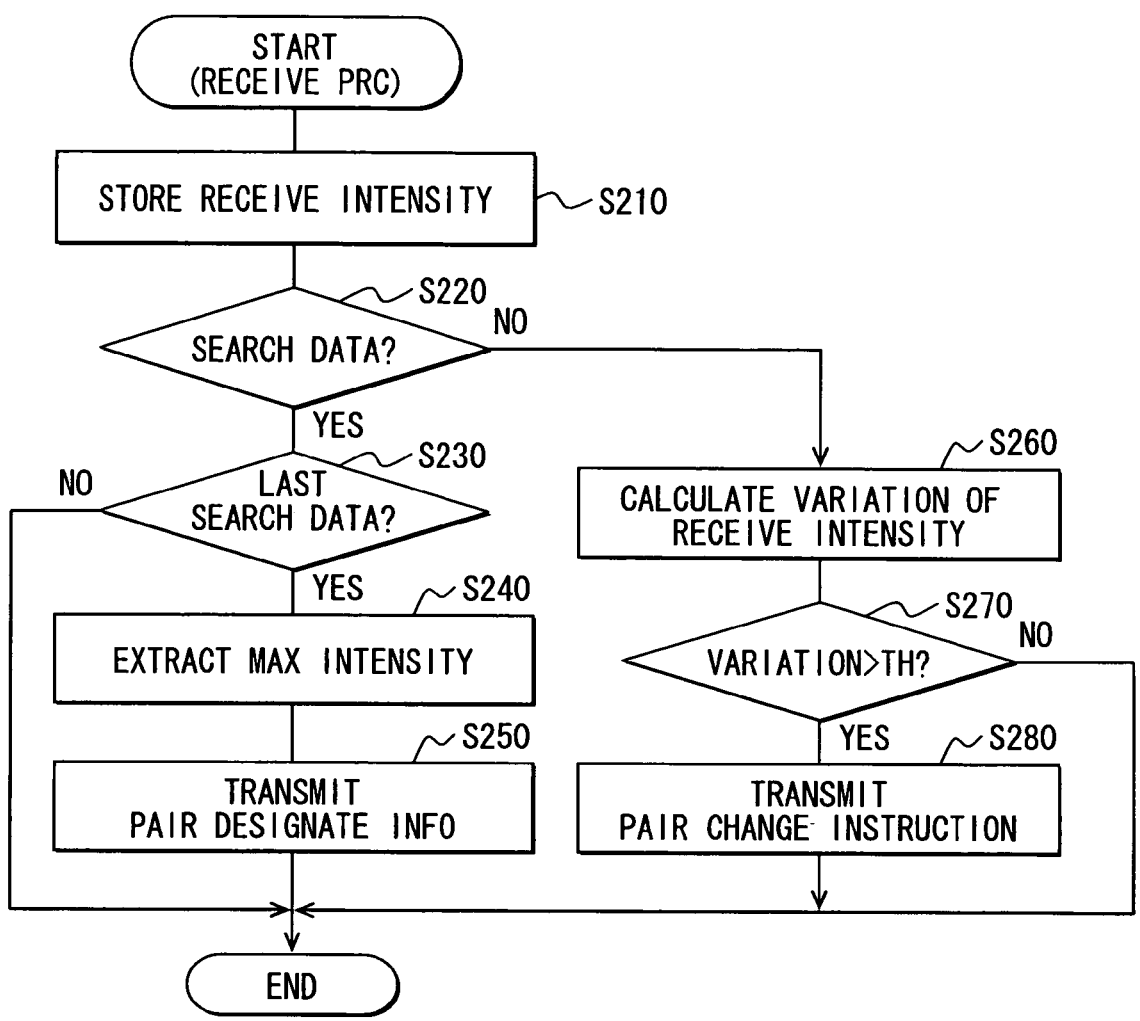
FIG. 9 is a flowchart of a reception process by an in-vehicle apparatus according to the second embodiment.

The following explains a reception process executed by the in-vehicle apparatus 20 with reference to a flowchart indicated in FIG. 9.

The present process is started each time the in-vehicle apparatus 20 receives a transmission signal from the portable terminal 10a. Alternatively, instead of starting each time the reception signal is received, the present process may be executed only for a period allowed by another in-vehicle apparatus (unshown).

As the present process starts, at S210, a measurement result of a reception intensity of a received signal is stored in a memory. At S220, it is determined whether the reception data which is obtained by demodulating the received signal is search data transmitted at S120 in the transmission process. It is noted that whether to be search data is determined based on the identification information added to the transmission data.

When it is determined at S220 that it is search data, the processing proceeds to S230, where it is then determined whether the received one is the last one among the data transmitted serially as many as the number of driving electrode pairs. When it is determined at S230 that it is not the last one, the present process is ended. When it is determined that it is the last one, the processing proceeds to S240, where the data having the maximum reception intensity is extracted among the search data accumulated at S210.

At S250, the pair setup information which specifies the driving electrode pair corresponding to the extraction result at S240 is transmitted to the portable terminal 10a by the intrabody communication, and the present process is ended. When it is determined at S220 that the received one is not search data but usual data transmitted at S160, the processing proceeds to S260, where a reception intensity variation amount is calculated which is a difference between the reception intensity of the presently received usual data and the maximum reception intensity extracted at S240. Thus, the reception intensity variation amount is obtained by [maximum reception intensity]−[reception intensity presently received].

At S270, it is determined whether the variation amount calculated at S260 is greater than a predetermined threshold value. When the variation amount is not greater than the threshold value, the present process is directly ended. When the variation amount is greater than the threshold value, it is determined that the reception intensity is significantly reduced. The processing thus proceeds to S280, where a pair change instruction is transmitted to the portable terminal 10a by the intrabody communication; the pair change instruction requires the change of the driving electrode pair. Then the present process is ended.

<Operation>

Figure 10:
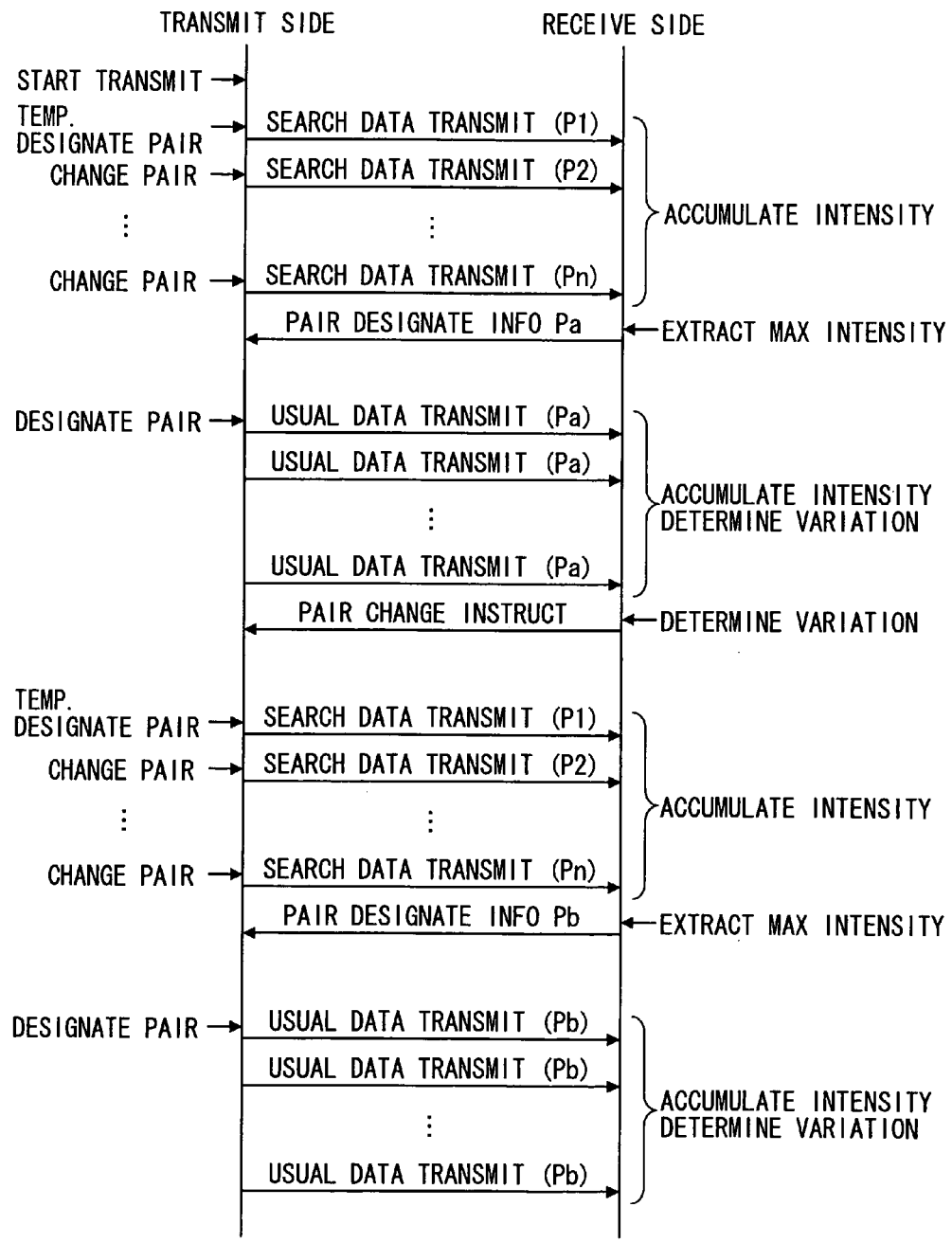
FIG. 10 is a sequence diagram illustrating a systematic operation according to the second embodiment.

In the smart entry system of the present second embodiment, as illustrated in FIG. 10, initially, similarly to the first embodiment, the portable terminal 10a of the transmission side transmits the transmission signal based on the same transmission data (search data) repeatedly n times as many as the number of driving electrode pairs (n=3, at present case) while repeatedly changing the driving electrode pairs.

Then, the in-vehicle apparatus 20 of the reception side returns to the portable terminal 10a the pair setup information based on the reception intensity when each search data is received. The portable terminal 10a then performs subsequent data transmission (usual data) by using the driving electrode pair specified by the pair setup information, i.e., the maximum-intensity supplying driving electrode pair, which provides the maximum reception intensity in the in-vehicle apparatus 20 (Pa, Pb in FIG. 10).

In addition, when the in-vehicle apparatus 20 determines that the reception intensity of the transmission signal based on the usual data falls by an amount exceeding the threshold value from the maximum reception intensity extracted when previously returning the pair setup information, the in-vehicle apparatus 20 returns a pair change instruction. When the portable terminal 10a receives the pair change instruction, the portable terminal 10a executes again the transmission of search data and the reception of pair setup information for retrieving a driving electrode pair which provides the maximum reception intensity in the in-vehicle apparatus 20 to thereby re-designate the driving electrode pair used for the transmission of the usual data.

<Effect>

As explained above, the portable terminal 10a transmits search, data (the identical transmission data) until all the driving electrode pairs are rounded completely, thereby searching a driving electrode pair which is most suitable for the data communications. The driving electrode pair is extracted by the result of searching; then, the usual data are repeatedly transmitted using the extracted driving electrode pair while the repeated usual data contain respectively different data elements.

Therefore, according to the portable terminal 10a of the present second embodiment when there are multiple data or data elements which should be transmitted, the first transmission data or data element is treated as search data and subsequent transmission data or data elements are treated as usual data. Such a configuration can minimize the transmission using the driving electrode pair which provides a weak reception intensity in the in-vehicle apparatus 20 and, furthermore, reduce the power consumption in the portable terminal 10a.

In addition, even during the transmission of the usual data, the portable terminal 10a receives from the in-vehicle apparatus 20 a pair change instruction which indicates that the reception intensity has changed or decrease significantly. In such a case, the portable terminal 10a resumes the search for the suitable driving electrode pair.

Under the above configuration of the portable terminal 10a, even if the optimal transmission channel on the transmission medium is varied during the data communications by the changes in the posture of the user who carries the portable terminal 10a or the holding state of the portable terminal 10a, the driving electrode pair used by the portable terminal 10a for transmission is promptly changed to the driving electrode pair corresponding to the new transmission channel, thereby maintaining the favorable transmission quality continuously.

[References]

Under the above embodiments, the apparatus, terminal etc. may be also referred to as follows. The portable terminals 10, 10a may be referred to as a communications apparatus. The in-vehicle apparatus 20 and the vehicle-side electrode 30 may be correctively referred to as an external apparatus. The electrode group 11 may be referred to as an electrode group. The driving electrode changeover switch 13 may be referred to as an electrode selection means, section, or device. The transmission circuit 15 may be referred to as a transmission means, section, or device. The processing S110 to S130 executed by the control circuit 17 may be referred to as a first transmission control means or section, or a search data transmission control means or section. The reception circuit 16 and/or the processing S140 executed by the control circuit 17 may be referred to as an information acquisition means or section. The processing S150 to S180 executed by the control circuit 17 may be referred to as a second transmission control means or section, or a usual data transmission means or section. The directionality adjustment section, which may be included in the control circuit 17, may be referred to as a directionality adjustment means, device, or circuit.

Other Embodiments

Up to this point, description has been given to the several embodiments of the present invention. Further, the present invention is not limited to the above embodiments, and it can be variously embodied, without departing from the subject matter of the present invention.

For instance, under the above embodiments, the electrodes which constitutes the electrode group 11 are provided to be shaped of a disc or circular plate. Without need to be limited thereto, it may be shaped of a hemisphere, a cone, or a polygon, instead of a circle. In addition, in the above embodiments, the electrode group 11 is configured as three electrodes D1 to D3 located at each vertex of an equilateral triangle. Without need to be limited thereto, for instance, the electrode group 11 may be configured, as illustrated in FIG.

11A, three electrodes D0 to D2 located at respective vertices of an isosceles right triangle, D0 being at the right-angled vertex.

Figure 11A:
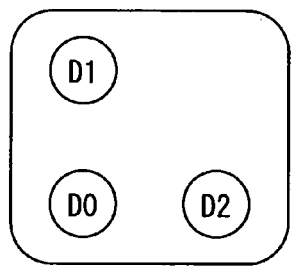
FIGS. 11A to 11C are diagrams for explaining another example of a configuration of an electrode group, an example of designating a driving electrode pair, etc.
Figure 11B:
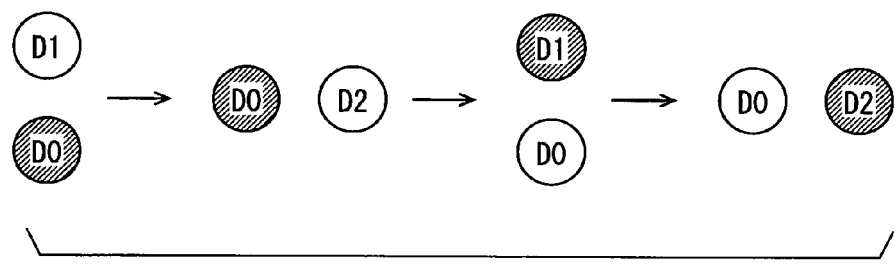
Figure 11C:
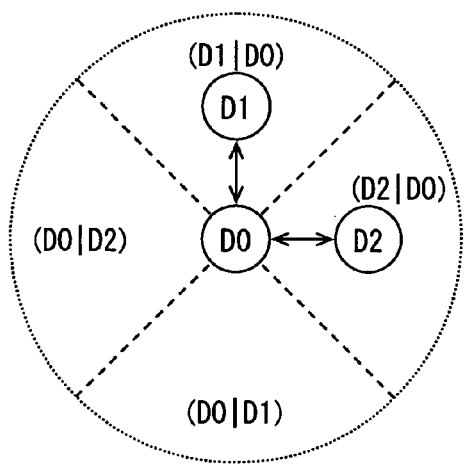

In such a configuration, as illustrated in FIG. 11B, the driving electrode pair may be designated as (D1|D0), (D2|D0), (D0|D1), and (D0|D2). If each driving electrode pair has a beam width of ±45 degrees focusing on the direction of the directional vector as illustrated in FIG. 11C, the favorable signal transmission can be achieved to cover all the directions.

Figure 12A:
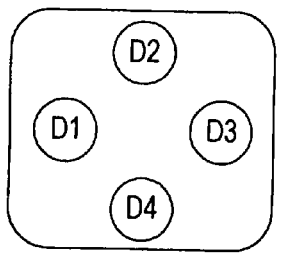
FIGS. 12A to 12E are diagrams for explaining another example of a configuration of an electrode group, an example of designating a driving electrode pair, etc.
Figure 12B:
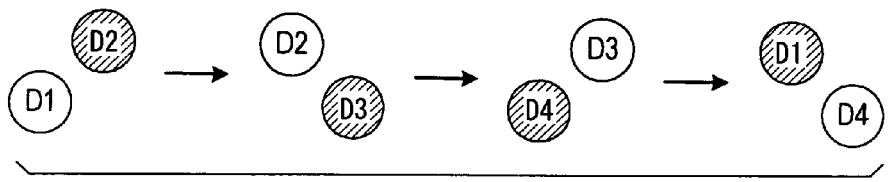
Figure 12C:
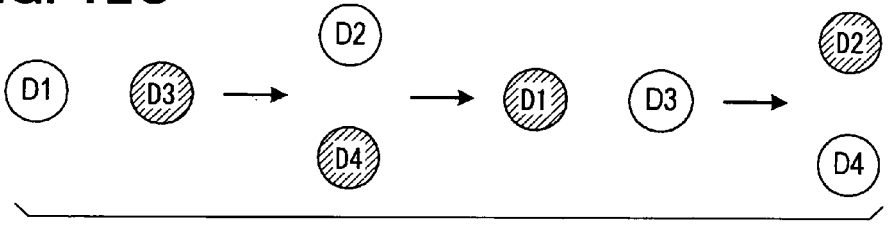
Figure 12D:
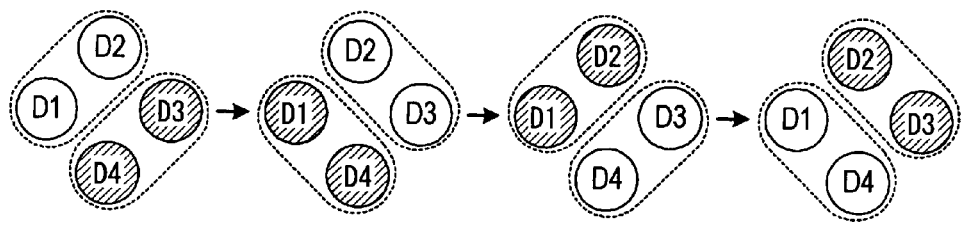
Figure 12E:
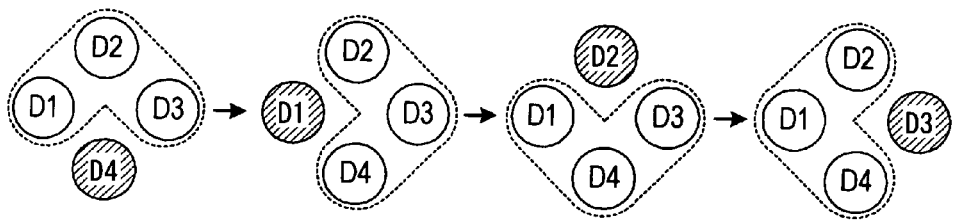

In addition, as illustrated in FIG. 12A, the electrode group 11 may be configured as four electrodes D1 to D4 located respectively at the angle vertices of a regular tetragon. In such a case, the driving electrode pairs are provided, as illustrated in FIGS. 12B to 12E. In FIG. 12B, the directional vector is provided to be along a side of a regular tetragon by designating the driving electrode pairs: (D1|D2), (D2|D3), (D3|D4), and (D4|D1). Alternatively, in FIG. 12C, the directional vector is provided to be along a diagonal line of a regular tetragon by designating the driving electrode pairs: (D1|D3), (D2|D4), (D3|D1), and (D4|D2). Further, alternatively, in FIG. 12D, each of the first and the second driving electrode is configured by several (two) electrodes, respectively such as: (D1,D2|D3,D4), (D2,D3|D4,D1), (D3,D4|D1,D2), and (D4,D1|D2,D3). Further, alternatively, in FIG. 12E, a single electrode is designated as the second driving electrode, and the other electrodes may be designated as the first driving electrode such as: (D1,D2,D3|D4), (D2,D3,D4|D1), (D3,D4,D1|D2), and (D4,D1,D2|D3).

Figure 13A:
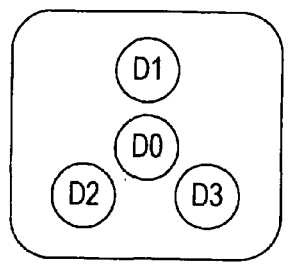
FIGS. 13A to 13D are diagrams for explaining another example of a configuration of an electrode group, an example of setting a driving electrode pair, etc.
Figure 13B:
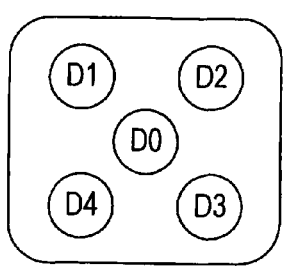

In addition, as illustrated in FIGS. 13A, 13B, the electrode group 11 may be configured by n+1 electrodes D0 to Dn located at respective vertices and the center of a regular n polygon (n=3 and 4) while the electrode D0 is located at the center.

Figure 13C:
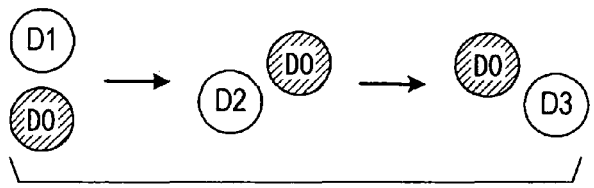

In such a case, the driving electrode pairs may be provided so as to fix the center electrode D0 to the first or second driving electrode. In detail, in the case of n=3, as illustrated in FIG. 13C, the driving electrode pairs are as follows: (D1|D0), (D2|D0), and (D3|D0).

Figure 13D:
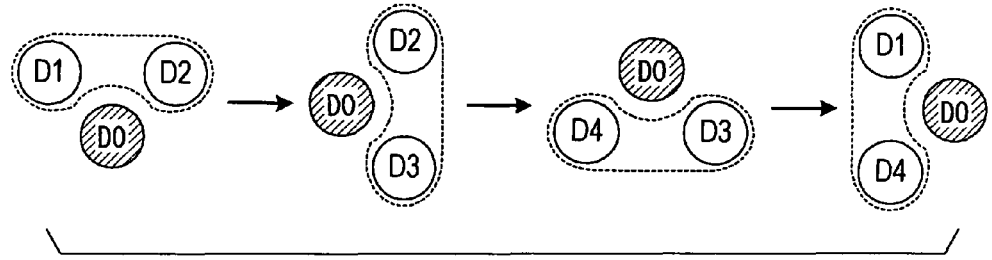

In addition, in the case of n=4, the first driving electrode may be configured by several electrodes as illustrated in FIG. 13D, for example, (D1,D2|D0), (D2,D3|D0), (D3,D4|D0), and (D4,D1|D0).

Further, in the above embodiments, the two electrodes which constitute the driving electrode pair are clearly distinguished to a signal electrode and a reference electrode. Without need to be limited thereto, without distinguishing them, a differential signal may be transmitted. In such a case, the directionality of the driving electrode pair is provided to be shaped of a numeral character of "8." In other words, the directional vector is provided to be two-way directional instead of one-way directional from one electrode to the other electrode. Accordingly, among the above-mentioned driving electrode pairs, there are driving electrode pairs whose directional vectors have directions mutually reverse to each other. In such a case, those driving electrode pairs can be unified. Thus, the number of driving electrode pairs can be reduced, thereby simplifying the control of the driving electrode pairs.

Furthermore, even when two electrodes constituting the driving electrode pair are clearly differentiated to the signal electrode and the reference electrode, there are still arising directionalities reverse to each other. In such a case, if each of the directionalities reverse to each other has a sufficient intensity, the number of driving electrode pairs may be reduced like the case where the two electrodes constituting the driving electrode pair are not differentiated.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, a communications apparatus is provided as follows. The apparatus communicates with an external apparatus via a wearing body that functions as a transmission medium. The apparatus is worn by the wearing body, which contacts the external apparatus. An electrode group is configured to include at least three electrodes that are held in contact with or in proximity of the wearing body when the apparatus is worn by the wearing body. An electrode selection section is configured to (i) designate a plurality of driving electrode pairs, each driving electrode pair being a combination of a first driving electrode and a second driving electrode, the first driving electrode including at least a single electrode included in the electrode group, the second driving electrode including at least a single electrode, which is included in the electrode group but not included in the first driving electrode, (ii) designate a driving electrode pair group, which includes at least two driving electrode pairs that have mutually different directional vectors, each directional vector being a vector linking a position of a gravity center of the first driving electrode with a position of a gravity center of the second driving electrode, and (iii) select a single driving electrode pair from among the driving electrode pairs included in the driving electrode pair group. A transmission section is configured to transmit a signal to the wearing body via the driving electrode pair selected by the electrode selection section when the apparatus is worn by the wearing body.

As an optional aspect, the communications apparatus may further comprise a first transmission control section configured to (i) cause the electrode selection section to select in a sequence order the driving electrode pairs included in the driving electrode pair group and (ii) cause the transmission section to repeatedly transmit a signal based on an identical transmission data element during a duration up to a time when all the driving electrode pairs included in the driving electrode pair group are selected in the sequence order completely. The first transmission control section functioning as a search transmission control section may cause the transmission section to repeatedly transmit a search signal based on an identical transmission data element during the above duration.

Under such a configuration of the communications apparatus, signals based on the same transmission data can be transmitted to the directions of the directional vectors of all the designated driving electrode pairs. Thus, a nondirectional communications apparatus can be achieved which can carry out favorable signal transmissions in any direction.

As a further optional aspect, the above communications apparatus may further comprise an information acquisition section configured to acquire information for identifying a driving electrode pair which provides a maximum reception intensity in the external apparatus; and a second transmission control section configured to cause the electrode selection section to select a driving electrode pair specified from the information acquired by the information acquisition section and cause the transmission section to transmit a signal via the driving electrode pair selected by the electrode selection section. The second transmission control section functioning as a usual data transmission control section may cause the transmission section to transmit a usual signal subsequent to the search signal.

It is noted that the information acquisition section may acquire information by the data communications via the wearing body from the external apparatus, which received several signals based on the same transmission data by the control of the first transmission control section, i.e., the search transmission control section.

That is, the transmission by the second transmission control section, i.e., usual transmission control section, is made by using only a single driving electrode pair having the favorable transmission quality. This can eliminate the need of repeatedly transmitting signals based on the same transmission data or data element, thereby providing an effective transmission and suppressing the power consumption in the apparatus.

As an optional aspect, in the communications apparatus, at least one of the first driving electrode and the second driving electrode constituting the driving electrode pair may be constituted by a plurality of electrodes included in the electrode group. The apparatus may further comprise a directionality adjustment section configured to change a directionality of the driving electrode pair group by varying a phase or an amplitude of a signal supplied to the plurality of electrodes constituting the at least one of the first driving electrode and the second driving electrode.

Figure 14:
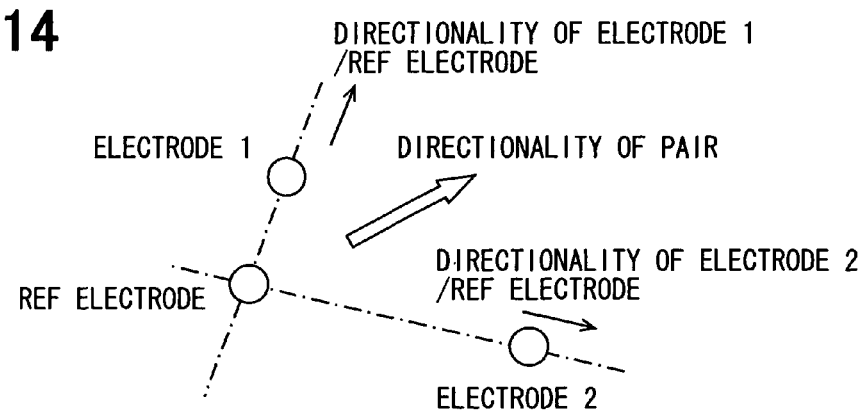
FIG. 14 is a diagram illustrating a method to change a directionality within a driving electrode pair.

That is, with reference to FIG. 14, the first driving electrode may be constituted by two electrodes (electrodes 1 and 2), which are respectively controlled; the second driving electrode may be constituted by the single electrode (reference electrode). Such an arrangement can provide two individual directionalities, one of which is by the reference electrode and the electrode 1 and the other of which is by the reference electrode and the electrode 2. The two directionalities are synthesized to thereby provide a directionality of a driving electrode pair. By controlling the phase or amplitude of signals supplied to the electrodes 1, 2, the individual directionalities can be varied, thereby providing a variety of directionalities of the driving electrode pair.

As an optional aspect, the electrode group may include n electrodes, which are arranged at vertices of a regular polygon having n sides, wherein the n is an integer more than two; alternatively, the electrode group may include n+1 electrodes, which are arranged at vertices and a center of a regular polygon having n sides, wherein the n is an integer more than two.

Such a configuration provides a symmetrical arrangement of the electrodes, thereby easily achieving the designation of the driving electrode pair group for changing the directions of the directional vectors uniformly (every identical angle).

As a further optional aspect of the above optional aspect, at least one of the driving electrode pairs included in the driving electrode pair group may be provided to have a directional vector which is along one of the n sides of the regular polygon.

In such a configuration, the direction of the directional vector of the driving electrode pair can be varied omnidirectionally (by 360 degrees) at identical angle intervals. Furthermore, the driving electrode pair can be provided to have the first driving electrode and the second driving electrode, which are located in both the ends of a single side of a regular n polygon (i.e., two adjoining vertices of a regular n polygon), for instance.

As a further optional aspect of the above optional aspect, at least one of the driving electrode pairs included in the driving electrode pair group may be provided to have a directional vector, which is along either a line which connects one of the vertices with a center of the regular n-side polygon or a line which connects a middle point in between one of the vertices with the center.

In such a configuration, the direction of the directional vector of the driving electrode pair can be similarly varied omnidirectionally (by 360 degrees) at identical angle intervals.

Herein, when the electrode group includes n electrodes, the driving electrode pair can be provided by mutually adjoining m (m is an integer less than n) electrodes, which constitute one of the first driving electrode and the second driving electrode, and (n-m) electrodes, which constitute the other of the first driving electrode and the second driving electrode, for example. In contrast, when the electrode group includes n+1 electrodes, the electrode located at the center of the regular n polygon constitutes either the first driving electrode or the second driving electrode, for example.

Furthermore, with respect to the regular n polygon, as n is greater, the direction of the directional vector can be more finely controllable. The regular n polygon may be an equilateral triangle; otherwise, the regular n polygon may be a regular tetragon.

In those configurations, the directionality which covers all the directions can be thus realizable using minimum necessary constituent elements.

Figure 15A:
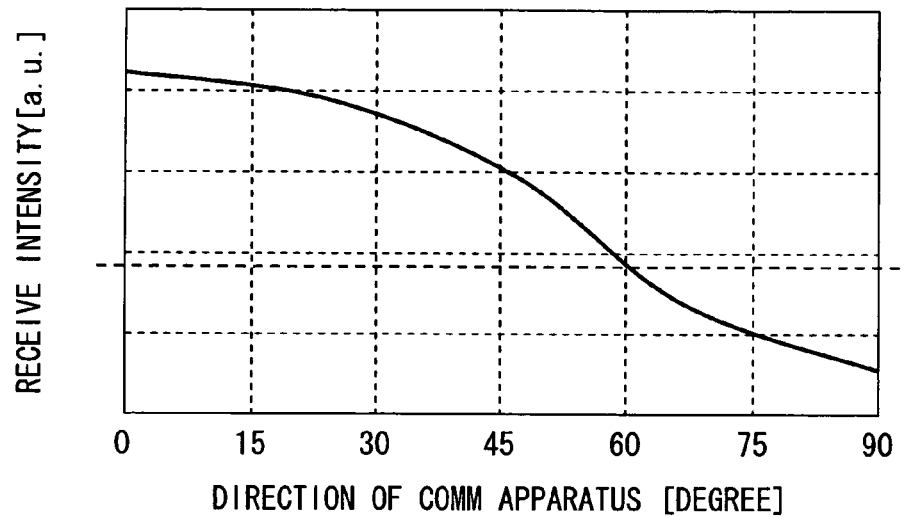
FIG. 15A is a diagram illustrating a measurement result of a directionality of a driving electrode pair.

FIG. 15A shows a graph which measures a relation between the direction of the communications apparatus (i.e., arrangement direction of the first and second driving electrodes) and reception intensity, which is indicated in arbitrary units.

Figure 15B:
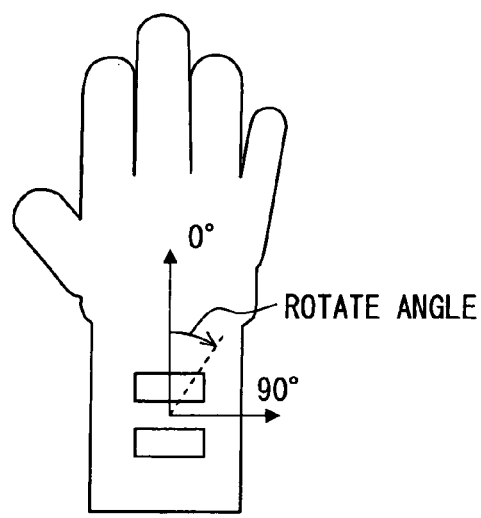
FIG. 15B is a diagram explaining a measurement method.

The graph is obtained by the following conditions. With reference to FIG. 15B, the angle of zero is set to the direction where the measurement apparatus is seen from the communications apparatus. The reception intensity is measured when the arrangement direction of the first and second driving electrodes (i.e., the direction of the directional vector) is varied in a range from zero to 90 degrees.

As illustrated in FIG. 15A, when the detection limit (a dotted line) is defined as reception intensity ten times or more in comparison with the noise level of the measurement instrument, a normal reception enabled area range (beam width of the driving electrode pair) can be corresponded to by a range of 60 degrees clockwise and counterclockwise (a total of 120 degrees).

Therefore, if three directional vectors having different directions of angles differentiated every 120 degrees are designated, the directionality which covers all the directions can be realizable.

Herein, the electrode group may include n electrodes, which are arranged at vertices of a right-angled triangle. Further, in this case, at least one of the driving electrode pairs included in the driving electrode pair group may be provided to have a directional vector which is along one of two sides which form a right-angled vertex of the right-angled triangle.

Under such a configuration of the communications apparatus, two types of driving electrode pairs are changed and the excitation direction is changed within the individual driving electrode pairs, thereby allowing the designation of the four types of the directional vectors having the different directions whose angles are differentiated every 90 degrees. The directionality which covers all the directions can be thus realizable.

As an optional aspect, the electrodes included in the electrode group may be arranged on an identical plane. In such a figuration or configuration, the directionality of the driving electrode pair can be varied along the surface of the wearing body which the electrode group is in contact with or in proximity of.

In addition, when the electrode group contacts the wearing object or body, electric currents flow in the wearing object or body. The electric currents become a lost part which does not contribute to the data communications. As the distance between the electrodes becomes shorter, the lost part becomes greater. Accordingly, the individual electrodes constituting the electrode group are favorably arranged to be separated farther from each other as long as possible, thereby reducing a lost part and enhancing the transmission efficiency.

Furthermore, the wearing object or body may be a resistor. For example, the wearing object or body may be a human body; namely, the communications apparatus may be for intrabody communication, which is data communications using a human body as a transmission medium.

It will be obvious to those skilled in the art that various changes may be made in the above-described embodiments of the present invention. However, the scope of the present invention should be determined by the following claims.

What is claimed:

1. A communications apparatus for communicating with an external apparatus via a wearing body that functions as a transmission medium, the apparatus being worn by the wearing body, the wearing body contacting the external apparatus, the apparatus comprising:
    an electrode group including at least three electrodes that are held in contact with or in proximity of the wearing body when the apparatus is worn by the wearing body;
    an electrode selection section configured to
        designate a plurality of driving electrode pairs, each driving electrode pair being a combination of a first driving electrode and a second driving electrode, the first driving electrode including at least a single electrode included in the electrode group, the second driving electrode including at least a single electrode, which is included in the electrode group but not included in the first driving electrode,
        designate a driving electrode pair group, which includes at least two driving electrode pairs that have mutually different directional vectors, each directional vector being a vector linking a position of a gravity center of the first driving electrode with a position of a gravity center of the second driving electrode, and
        select a single driving electrode pair from among the driving electrode pairs included in the driving electrode pair group; and
    a transmission section configured to transmit a signal to the wearing body via the driving electrode pair selected by the electrode selection section when the apparatus is worn by the wearing body, wherein
    at least one of the first driving electrode and the second driving electrode constituting the driving electrode pair is constituted by a plurality of electrodes included in the electrode group,
    the apparatus further comprising:
    a directionality adjustment section configured to change a directionality of the driving electrode pair group by varying a phase or an amplitude of a signal supplied to the plurality of electrodes constituting the at least one of the first driving electrode and the second driving electrode.

2. The communications apparatus according to claim 1, further comprising:
    a first transmission control section configured to
        cause the electrode selection section to select in a sequence order the driving electrode pairs included in the driving electrode pair group and
        cause the transmission section to repeatedly transmit a signal based on an identical transmission data element during a duration up to a time when all the driving electrode pairs included in the driving electrode pair group are selected in the sequence order completely.

3. The communications apparatus according to claim 2, further comprising:
    an information acquisition section configured to acquire information for identifying a driving electrode pair which provides a maximum reception intensity in the external apparatus; and
    a second transmission control section configured to
        cause the electrode selection section to select a driving electrode pair specified from the information acquired by the information acquisition section and
        cause the transmission section to transmit a signal via the driving electrode pair selected by the electrode selection section.

4. The communications apparatus according to claim 3, the second transmission control section being further configured to
    cause the transmission section to transmit a plurality of signals one signal by one signal in order, the plurality of signals being based on respectively different transmission data elements, via the driving electrode pair selected by the electrode selection section.

5. The communications apparatus according to claim 1, wherein
    the electrode group includes n electrodes, which are arranged at vertices of a regular polygon having n sides, wherein the n is an integer more than two.

6. The communications apparatus according to claim 5, wherein
    at least one of the driving electrode pairs included in the driving electrode pair group is provided to have a directional vector which is along one of the n sides of the regular polygon.

7. The communications apparatus according to claim 5, wherein
    at least one of the driving electrode pairs included in the driving electrode pair group is provided to have a directional vector, which is along either a line which connects one of the vertices with a center of the regular n-side polygon or a line which connects a middle point, which is in between the vertices, with the center.

8. The communications apparatus according to claim 5, wherein
    the regular n polygon is an equilateral triangle.

9. The communications apparatus according to claim 5, wherein
    the regular n polygon is a regular tetragon.

10. The communications apparatus according to claim 1, wherein
    the electrode group includes n+1 electrodes, which are arranged at vertices and a center of a regular polygon having n sides, wherein the n is an integer more than two.

11. The communications apparatus according to claim 10, wherein at least one of the driving electrode pairs included in the driving electrode pair group is provided to have a directional vector which is along one of the n sides of the regular polygon.

12. The communications apparatus according to claim 10, wherein
at least one of the driving electrode pairs included in the driving electrode pair group is provided to have a directional vector, which is along either a line which connects one of the vertices with a center of the regular n-side polygon or a line which connects a middle point, which is in between the vertices, with the center.

13. The communications apparatus according to claim 10, wherein
the regular n polygon is an equilateral triangle.

14. The communications apparatus according to claim 10, wherein
the regular n polygon is a regular tetragon.

15. The communications apparatus according to claim 1, wherein
the electrode group includes n electrodes, which are arranged at vertices of a right-angled triangle.

16. The communications apparatus according to claim 15, wherein
at least one of the driving electrode pairs included in the driving electrode pair group is provided to have a directional vector which is along one of two sides which form a right-angled vertex of the right-angled triangle.

17. The communications apparatus according to claim 1, wherein
the electrodes included in the electrode group are arranged on an identical plane.

18. The communications apparatus according to claim 1, wherein
the wearing body is a human body.

19. A method for controlling data communications taking place in the communications apparatus according to claim 1, the method comprising:
causing the electrode selection section to select in a sequence order the driving electrode pairs included in the driving electrode pair group; and
causing the transmission section to repeatedly transmit to the external apparatus a search signal based on an identical transmission data element during a duration up to a time when all the driving electrode pairs included in the driving electrode pair group are selected in the sequence order completely.

20. The method according to claim 19, further comprising:
acquiring information for identifying a driving electrode pair which provides a maximum reception intensity, which is detected in the external apparatus based on the search signals transmitted in the sequence order based on the identical transmission data element;
causing the electrode selection section to select a driving electrode pair specified from the acquired information; and
causing the transmission section to transmit an additional signal to the external apparatus via the driving electrode pair selected by the electrode selection section.

21. The method according to claim 20, wherein
in the causing of the transmission section to transmit an additional signal,
the transmission section is caused to transmit a plurality of additional signals one signal by one signal in order, the plurality of additional signals being based on respectively different transmission data elements, via the driving electrode pair selected by the electrode selection section.

22. A smart entry system for a vehicle, the system comprising:
a portable terminal being the communications apparatus according to claim 1; the terminal being shaped of a card and worn by a user being the wearing body;
a vehicle-side electrode provided in a door of the vehicle; and
an in-vehicle apparatus provided in the vehicle for executing intrabody communication with the portable terminal via the vehicle-side electrode when the user carrying the portable terminal touches the vehicle-side electrode, a combination of the vehicle-side electrode and in-vehicle apparatus functioning as the external apparatus contacted by the wearing body,
the portable terminal being further configured to store authentication data for identifying the user of the portable terminal, the authentication data being transmitted using the intrabody communication,
the in-vehicle apparatus being further configured to
receive the authentication data by the intrabody communication, and
determine whether that the authentication data is valid,
the in-vehicle apparatus being further configured to perform unlocking and locking of the door of the vehicle when the authentication data is determined to be valid.

23. A communications apparatus for communicating with an external apparatus via a wearing body that functions as a transmission medium, the apparatus being worn by the wearing body, the wearing body contacting the external apparatus, the apparatus comprising:
an electrode group including at least three electrodes that are held in contact with or in proximity of the wearing body when the apparatus is worn by the wearing body;
an electrode selection section configured to
designate a plurality of driving electrode pairs, each driving electrode pair being a combination of a first driving electrode and a second driving electrode, the first driving electrode including at least a single electrode included in the electrode group, the second driving electrode including at least a single electrode, which is included in the electrode group but not included in the first driving electrode,
designate a driving electrode pair group, which includes at least two driving electrode pairs that have mutually different directional vectors, each directional vector being a vector linking a position of a gravity center of the first driving electrode with a position of a gravity center of the second driving electrode, and
select a single driving electrode pair from among the driving electrode pairs included in the driving electrode pair group; and
a transmission section configured to transmit a signal to the wearing body via the driving electrode pair selected by the electrode selection section when the apparatus is worn by the wearing body, wherein
the electrode group includes n+1 electrodes, which are arranged at vertices and a center of a regular polygon having n sides, wherein the n is an integer more than two.

24. The communications apparatus according to claim 23, wherein
at least one of the driving electrode pairs included in the driving electrode pair group is provided to have a directional vector, which is along either a line which connects one of the vertices with a center of the regular n-side polygon or a line which connects a middle point, which is in between the vertices, with the center.

25. A communications apparatus for communicating with an external apparatus via a wearing body that functions as a transmission medium, the apparatus being worn by the wearing body, the wearing body contacting the external apparatus, the apparatus comprising:
an electrode group including at least three electrodes that are held in contact with or in proximity of the wearing body when the apparatus is worn by the wearing body;
an electrode selection section configured to
designate a plurality of driving electrode pairs, each driving electrode pair being a combination of a first driving electrode and a second driving electrode, each driving electrode pair being designated by being supplied with a same signal having a same phase and a same amplitude to function as a single driving electrode, the first driving electrode including at least a single electrode included in the electrode group, the second driving electrode including at least a single electrode, which is included in the electrode group but not included in the first driving electrode,
designate a driving electrode pair group, which includes at least two driving electrode pairs that have mutually different directional vectors, each directional vector being a vector linking a position of a gravity center of the first driving electrode with a position of a gravity center of the second driving electrode, and
select a single driving electrode pair from among the driving electrode pairs included in the driving electrode pair group; and
a transmission section configured to transmit a signal to the wearing body via the driving electrode pair selected by the electrode selection section when the apparatus is worn by the wearing body, wherein
at least one of the driving electrode pairs included in the driving electrode pair group is provided to have a directional vector, which is along either a line which connects one of the vertices with a center of the regular n-side polygon or a line which connects a middle point, which is in between the vertices, with the center.

26. The communications apparatus according to claim 25, wherein
the electrode group includes n electrodes, which are arranged at vertices of a regular polygon having n sides, wherein the n is an integer more than two.

27. The communications apparatus according to claim 25, wherein
the electrode group includes n+1 electrodes, which are arranged at vertices and a center of a regular polygon having n sides, wherein the n is an integer more than two.

* * * * *